Oct. 17, 1961  R. E. MEYER  3,004,741
CABLE SUPPORT LATCH
Filed Aug. 18, 1958
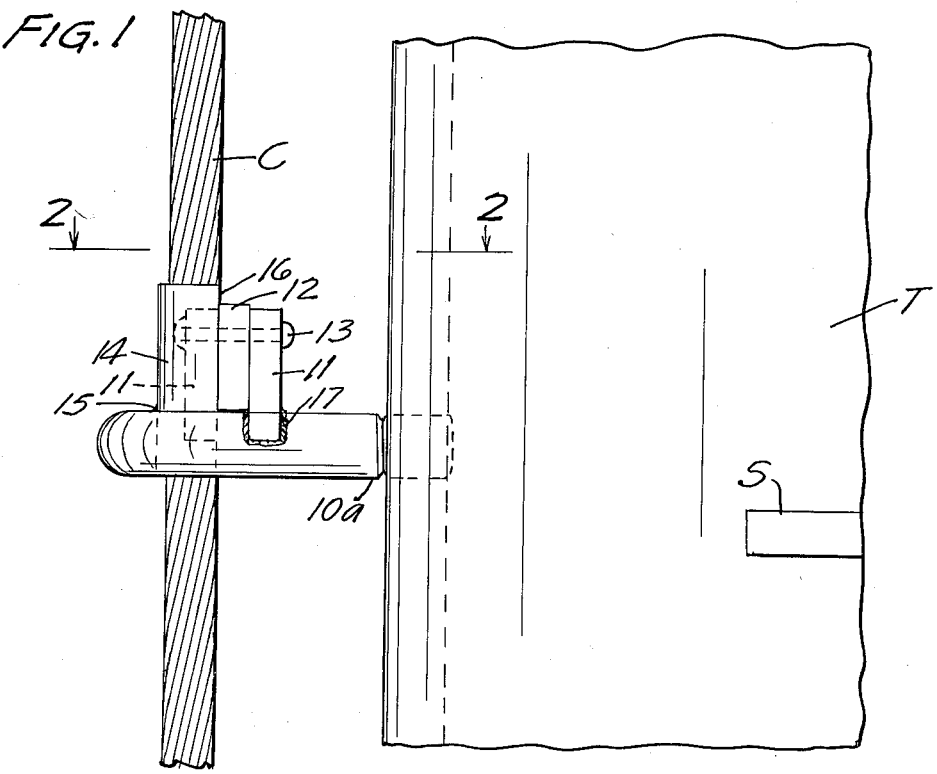
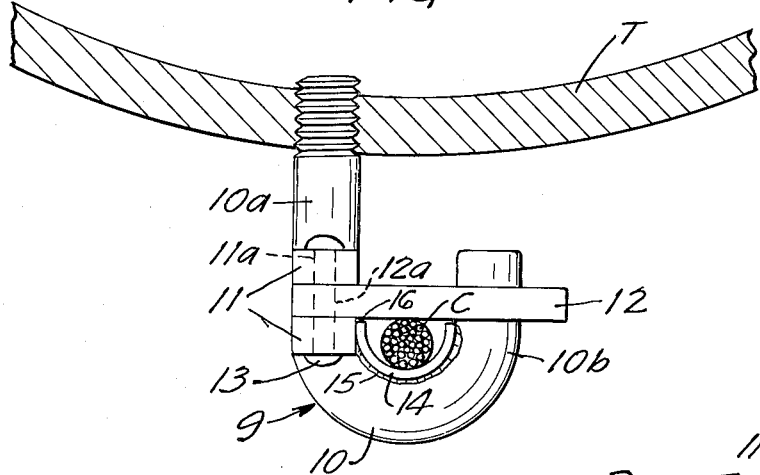
INVENTOR
ROY E. MEYER
BY
Williamson, Schroeder & Palmatier
ATTORNEYS

United States Patent Office 3,004,741
Patented Oct. 17, 1961

3,004,741
CABLE SUPPORT LATCH
Roy E. Meyer, Red Wing, Minn.
Filed Aug. 18, 1958, Ser. No. 755,633
1 Claim. (Cl. 248—74)

This invention relates to safety appliances used by a workman in connection with climbing a tall structure such as a lighting tower or the like, and more specifically relates to a device for anchoring the safety device-mounting vertical cable to the tower at points intermediate the upper and lower ends of the cable which are affixedly secured to the structure.

An object of my invention is to provide a new and improved cable-anchoring device of simple and inexpensive construction and operation for releasable securing the safety device-mounting cable at points intermediate its ends which are affixedly secured to the tower.

Another object of my invention is the provision of a novel device for releasably anchoring a stiff safety appliance-mounting cable in such a manner as to prevent kinking of the cable at the point of anchoring which is intermediate the ends of the cable which are affixedly secured to the structure or tower to be claimed.

A further object of my invention is to provide an improved and novel device which is easily operable by workmen employing only one hand in order to operate the device so as to release, or secure a safety appliance-mounting cable adjacent the structure being climbed and at points intermediate the ends of the cable which are affixedly secured to the structure or tower.

These and other objects and advantages of my invention will more fully appear from the following description, made in connection with the accompanying drawings, wherein like reference characters refer to the same or similar parts throughout the several views, and in which:

FIG. 1 is a side elevation view of the invention shown in use in anchoring a safety appliance-mounting cable to the tower which is to be climbed; and FIG. 2 is a top plan view of the invention with the cable and tower shown in section taken on a plane as indicated at 2—2 in FIG. 1.

One form of the present invention is shown in the drawings and described herein. The present invention, which is indicated in general by numeral 9 is to be used with a stiff safety appliance-mounting cable C which will be securely and affixedly anchored at its upper and lower ends to a tower or other vertical structure T which is to be climbed by a workman. The tower may comprise a support for a battery of lights such as the type employed in stadiums and athletic fields and the tower may be 100 feet in height or more. Although the cable C may be a multiple strand steel cable which is commonly ¼ to ⅜ inch in diameter, and is therefore quite stiff, the cable will without the use of the present invention swing out from the tower T under influence of wind or movement of the workman whose safety belt is connected through a safety appliance to the cable. It should be understood that in order for the safety device (not shown) to slide easily up and down the cable C, the cable C must be substantially free of kinks.

The device 9 comprising the present invention includes an elongate rigid hook member 10 having a threaded shank 10a which is threaded into a tapped aperture in the tower T. The hook member 10 has the outer end portion 10b bent back upon itself to define the cable-receiving bight, and to also define the open end of the hook which is spaced from the surface of the tower T a distance greater than the diameter of the cable C so as to permit the cable to be easily moved into and out of the bight and away from the device 9. The device 9 is provided with means for removably securing the cable C in bight of the hook member, and in the form shown, such means include an elongate rigid retaining element or bar 12 which extends across the bight portion and overlies the outer open end 10b of the hook member and also the shank portion 10a of the hook member which is normally oriented in horizontal position so as to provide a vertical opening through which the cable extends. A pair of upright rigid ears 11 are affixedly secured as by welding 17 to the shank portion 10a of the hook member 10 on opposite sides of one end of bar 12. The ears 11 and the end of bar 12 are provided with aligned apertures 11a and 12a respectively through which projects a pivot pin 13. The pivot pin 13 may be secured in the aligned apertures as by slightly crimping the ends of the pin.

The device 9 is provided with means for preventing bending or kinking of the cable C when the cable is retained adjacent the tower by means of the device 9, and in the form shown, such means include an elongate and upright substantially semi-circularly shaped, cable-cradling element 14 which is oriented in an upright position in the bight of the hook member 10 and lies against the inner side of the member 10 and is secured thereto as by a welding 15. It will be particularly noted that the cable-cradling member 14 has a length which is substantially greater than the diameter of the cable. Furthermore, it will be noted in FIG. 2 that the upright edges 16 of the upright cable-cradling element 14 are disposed in close proximity with the retaining bar 12 so as to define, in cooperation with the bar 12, an enclosure substantially surrounding all portions of the cable passing through the device 9. Furthermore, it will be noted that the bar 12, when in cable-retaining position, confronts the cable-cradling member 14 at a position intermediate the upper and lower ends of member 14 so as to urge the cable C against the cradling member 14, substantially throughout the entire length of the member 14 and thereby prevent bowing of the cable at the device 9.

When the tower T is being climbed by workman who will climb on the steps S, his cable clamping safety device will move upwardly along the cable C. The cable clamping device must pass by the device 9, and therefore, when the cable clamping safety device approaches the anchoring device 9, the workman will swing the retaining element 12 upwardly and out of obstructing relation with the cable and the cable will then be moved inwardly toward the tower and around the open end 10b of the anchoring device 9, whereupon, the cable clamping safety device will be moved upwardly along the cable to a position above the anchoring device 9. At this time, the cable will be moved around the open end 10b of the hook member 10 again and into the bight portion and against the cradle 14, and then the retaining element 12 will be swung into the position shown in FIG. 2.

It will be understood that the cable will tend to swing outwardly away from the tower T under the influence of wind or under the influence of urging by the workman. When the cable is moved outwardly from the tower in this fashion, the elongate, upright, rigid cable-cradling member 14, in co-operation with the rigid retaining bar 12, will maintain a length of the cable C adjacent the anchoring device 9, in a linear condition so as to prevent any possibility of kinking of the cable. Because of the elongated nature of the cradling member 14, and because of the stiff nature of the cable, portions immediately above and below the cradle 14 with also remain in substantially linear condition and any flexing of the cable C will be in the form of a gradual bend rather than a sharp kink.

It will be seen that I have provided a new and improved device for anchoring a safety device-mounting cable at points intermediate the ends of the cable and in such a manner as to permit ready and easy releasing of the cable to allow the safety device to be easily moved upwardly and downwardly along the cable.

It will, of course, be understood that various changes may be made in the form, details, arrangement and proportions of the parts without departing from the scope of my invention which consists of the matter shown and described herein and set forth in the appended claims.

What is claimed is:

Apparatus for anchoring an upright cable at a point intermediate its ends to a tower to permit a safety appliance to be moved up and down along the cable, comprising a rigid hook oriented horizontally to permit the cable to extend upwardly through the bight of the hook, said hook having a shank adapted to be affixed to the tower and having an open end adapted to be spaced from the tower to permit the cable to be moved transversely into and out of the bight, an elongate, rigid and linear cable-cradling member of semi-circular shape and being affixed in the bight of the hook with the upright edges thereof facing toward the shank and the open end of the hook, a rigid cable-retaining bar having a flat surface in confronting relation with the edges of the cable-cradling member at a position between the upper and lower ends of said member, and one end of said bar overlying the open end of the hook and the other end of the bar overlying the shank, a pair of upstanding ears on opposite sides of the bar and affixed on the shank, and a pivot extending through the ears and through the bar and permitting swinging of the bar in a vertical plane into and out of obstructing relation with respect to the cable-cradling member on the hook.

References Cited in the file of this patent

UNITED STATES PATENTS

| Re. 2,042 | Norcross | Aug. 1, 1865 |
| 580,770 | Cashion | Apr. 13, 1897 |
| 1,851,735 | Smith | Mar. 29, 1932 |
| 2,810,537 | Anderson | Oct. 22, 1957 |